Sept. 8, 1970                    R. D. BOND                      3,527,092
                      AIR GAUGING THREE-DIMENSIONAL OBJECTS
Filed Sept. 4, 1968                                        2 Sheets-Sheet 1

INVENTOR
ROBERT D. BOND
BY
Morse, Altman & Oates
ATTORNEYS

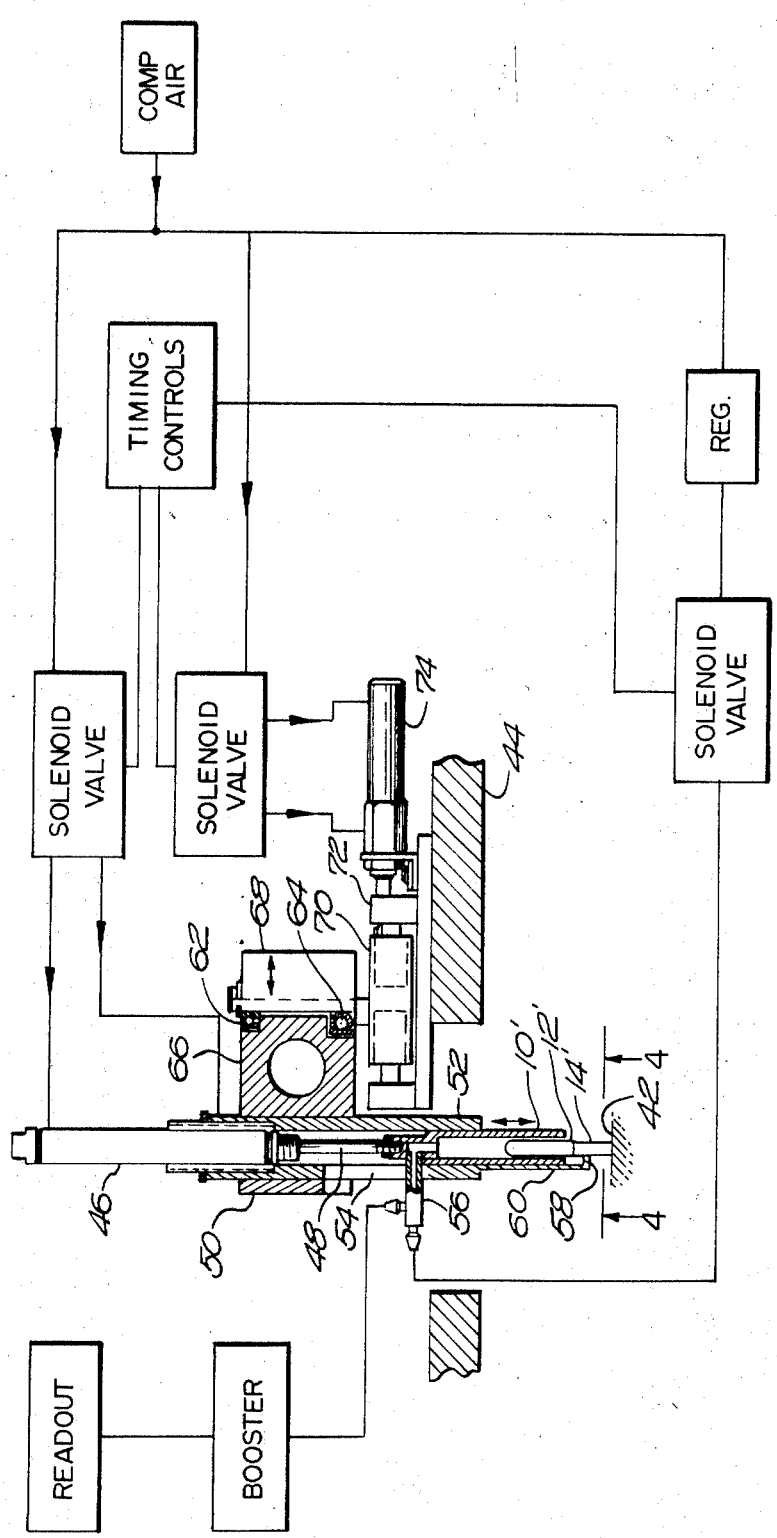

United States Patent Office 3,527,092
Patented Sept. 8, 1970

3,527,092
AIR GAUGING THREE-DIMENSIONAL OBJECTS
Robert D. Bond, Waltham, Mass., assignor to B. C. Ames Company, Waltham, Mass., a corporation of Massachusetts
Filed Sept. 4, 1968, Ser. No. 757,242
Int. Cl. G01b 13/08
U.S. Cl. 73—37.5                                                    3 Claims

ABSTRACT OF THE DISCLOSURE

Three dimensional objects, particularly cylindrical parts, are gauged by means of a tubular nozzle open at one end and closed at the other. The nozzle is connected to a source of compressed air which normally exhausts out the open end thereof. The part, however, once it is inserted in the nozzle, increases the back pressure of the air and this increase is directly related to the size of the object. This increase is measured to provide an extremely precise indication of the size of the object or any variation from a predetermined size.

BACKGROUND OF THE INVENTION

Field of the invention

This invention relates generally to air gauging and more particularly is directed towards a novel system, including a novel air nozzle, for air gauging three dimensional objects, particularly cylindrical parts.

Description of the prior art

Gauging of three dimensional parts, particularly cylindrical objects, customarily has been carried out by mechanical devices such as micrometers, calipers and the like. While instruments of this type are usually accurate they require physical contact with the object and, in addition, are usually quite slow being carried out by hand and calling for the manipulation of the tools and the reading of scales which are usually quite small. Furthermore, the use of measuring tools of this type is unsatisfactory where the object being measured is soft or easily damaged.

Accordingly, it is an object of the present invention to provide a novel gauging system and apparatus for three dimensional objects in which there is no physical contact with the part being gauged. A further object of the invention to provide a system which is adapted to gauge a three dimensional object quickly and with great precision.

SUMMARY OF THE INVENTION

This invention features an air gauging system and associated apparatus adapted to gauge three dimensional objects, particularly cylindrical parts. The invention includes a tubular nozzle open at one end and closed at the other connected to a source of compressed air and to a back pressure measuring gauge. The air is delivered to the blind end of the nozzle and exhausted through the open end. The part that is to be gauged is inserted in the open end of the nozzle thus restricting the flow of air causing an increase in back pressure directly related to the dimension of the object. The back pressure change is measured and this provides the desired information with respect to the dimensions of the object or any variations thereof.

This system may be employed for use in mass produced objects moving past a given point by dropping the nozzle down over the part, measuring the back pressure so as to gauge the part, and then removing the nozzle to permit the part to advance from the gauging station.

BRIEF DESCRIPTION OF THE DRAWINGS

FIG. 2 is a view in side elevation, partly in section and somewhat schematic, of an air gauging apparatus for use in the automatic gauging of three dimensional parts being carried by a conveyor or the like, FIG. 3 is a top plan view of the FIG. 2 apparatus, and, FIG. 4 is a cross-sectional view taken along the line 4—4 of FIG. 2.

DESCRIPTION OF THE PREFERRED EMBODIMENTS

Figure 1:
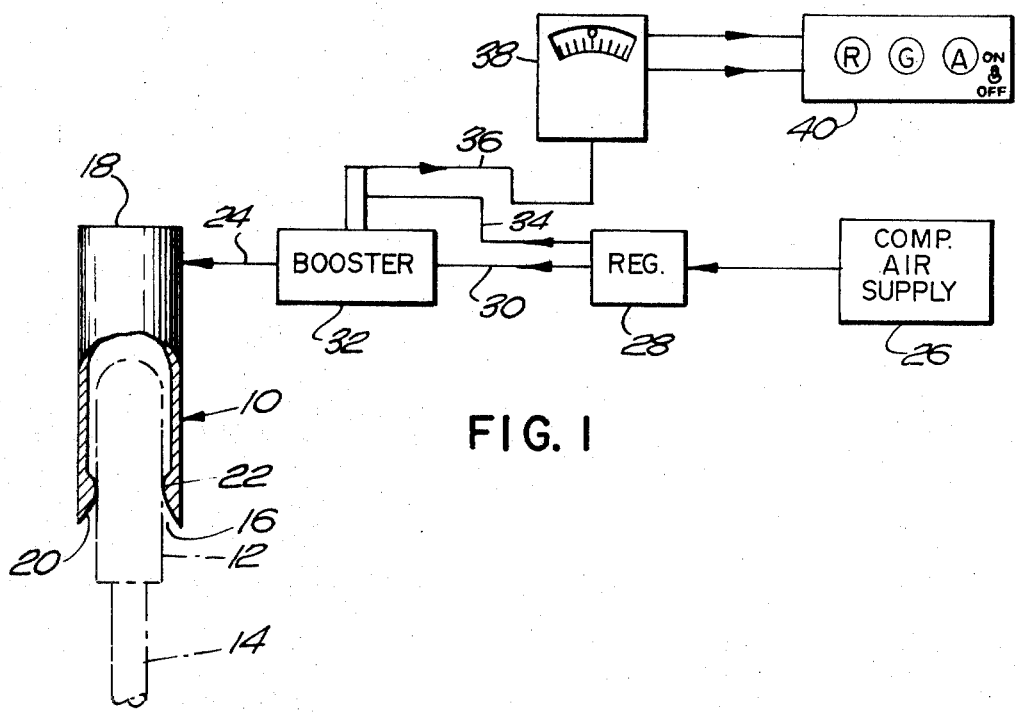
FIG. 1 is a somewhat schematic diagram of a system for air gauging three dimensional objects according to the invention.

Referring now to the drawings and particularly to FIG. 1, the reference character 10 generally indicates a nozzle adapted to gauge a three dimensional part 12 which may be mounted on a suitable support 14. In the illustrated embodiment the part 12 has a cylindrical configuration and the nozzle 10 is likewise cylindrical being formed with an opening 16 at the lower end while the upper end thereof is closed by a wall 18. The nozzle 10 is hollow and is formed with an inwardly facing tapered annular shoulder 20 about the opening 16. The cross-sectional diameter of the shoulder 20 is slightly greater than the average cross-sectional diameter of the part 12 which is being gauged whereby, when the part 12 is inserted in the opening of the nozzle as shown, there will be a slight annular clearance at 22 between the shoulder 20 and the outer surface of the part 12. The clearance is greater in the upper portion of the nozzle. This configuration facilitates the gauging operation when a fluid such as air is introduced under pressure to the nozzle. It will be understood that flow from the nozzle is reduced by insertion of the part 12 thus causing an increase in back pressure in the air system. Air is allowed to escape through the clearance between the nozzle and the part and the back pressure will vary according to the clearance which in turn depends upon the size of the part. Thus the back pressure is related to the size of the part and serves as a measuring factor. The annular shoulder 20 reduces the restricted clearance through which the escaping air must travel before discharging and is preferred over a nozzle having flush cylindrical walls insofar as in the latter case restricted air would have to flow over the entire length of the part within the nozzle and may produce some adverse operating effects. Tapering of the shoulder 20 facilitates insertion of the part and enhances air flow.

In FIG. 1 air is introduced to the blind end of the nozzle 10 through a conduit 24, the air being furnished from a suitable compressed air source indicated generally by reference character 26 and passed through a pressure regulator 28. From the regulator 28 air passes through conduit 30 to a booster 32 such as disclosed in U.S. Pat. No. 3,194,055. The booster is connected by a conduit 34 to the regulator 28 and also by a conduit 36 to a gauge 38. The gauge 38 provides a visual indication of the back pressure developed in the nozzle by the part 12 being inserted therein. This back pressure will increase or decrease according to the clearance between the part and the nozzle walls which clearance depends on the size of the part. In addition to the gauge 38 a light indicator unit 40 may be connected to the gauge to provide another readout. The unit 40 typically is provided with three lights which may be colored red, green and amber and which are connected to the gauge in such a way that one of the lights will be illuminated each time a part is inserted in the nozzle. The particular light illuminated will quickly indicate to the operator whether or not the part is over size, under size or within prescribed limits.

Figure 3:
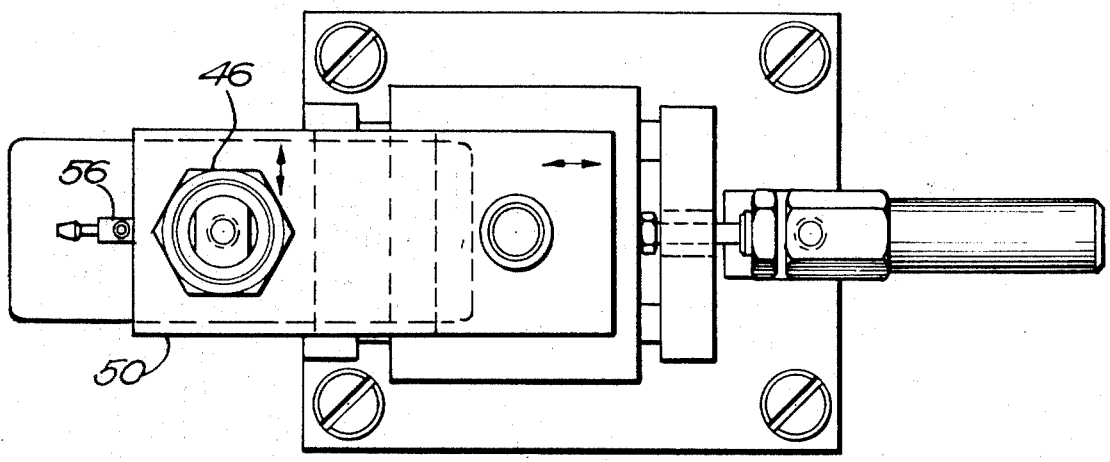
Figure 4:
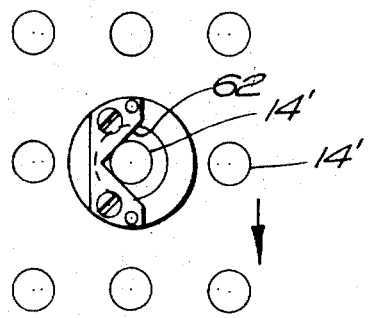

The system may be used on a piece-meal basis with the parts being inserted manually into the nozzle, but, for mass production operations an automatic system is preferred. Referring now more particularly to FIGS. 2, 3 and 4 there is shown a system for automatically gauging three dimensional articles. In FIG. 2, a conveyor 42 carries rows and columns of evenly spaced pin supports 14' in an upright position each support bearing a part 12'. In the illustrated embodiment the part 12' may be a capsule shell-half such as used in ethical drug products, it being the practice to mold capsule sections by dipping the cylindrical supports 14' in liquefied capsule-forming substance. The capsule builds up over the pin support and the wall thickness of the capsule is determined by the duration of the support within the solution. Wall thickness may be varied by increasing or decreasing the dipping time of the support in the solution. Obviously a variety of other items may be gauged by the system, the capsules being shown only by way of illustration.

Spanning the upper reach of the conveyor 42 is an overhead frame supporting a nozzle 10' and its associated equipment. The nozzle 10' is mounted for vertical reciprocation as well as for lateral movement so that it may be brought into gauging position with respect to each part 12' in a column. In practice, it is usually necessary to gauge but one part in each row of parts since all parts in that row should be of substantially the same dimensions whereas there may be some variation from one row to another. Hence each part in a column is gauged as being representative of the size of the row of parts although each part may be gauged separately, if desired. The apparatus for moving the nozzle includes a pneumatic piston and cylinder 46 drivingly connected to the upper end of the nozzle 10' by means of a connecting rod 48. The cylinder 46 is mounted to a carriage 50 by means of a tubular guide 52 which is slotted at 54 to accommodate reciprocation of a tubular connecting arm 56 extending horizontally from the upper end of the nozzle 10'. The guide 52 serves to insure that the nozzle 10' is reciprocated along a true vertical axis and to align the part and the nozzle. The guide is provided with a foot 58 detachably connected to the lower end of an extension 60 and formed with a V-notch 62 adapted to bear against the support 14' below the part 12' and thereby center the guide and nozzle 10' with respect to the part 12'.

The carriage 50 is mounted for limited horizontal longitudinal movement by means of slide bearings 62 and 64 engaging a guide block 66 to a cooperating support 68. The support 68, in turn, extends upwardly from a horizontally and laterally movable member 70 connected by means of a yoke 72 to a pneumatic piston and cylinder 74. The mounting arrangement for the nozzle permits it to be reciprocated vertically by the cylinder 46 and to be moved along two perpendicular axes in the horizontal plane, the longitudinal motion being free within a limited distance and the lateral movement being controlled by the cylinder 74. In operation, after a part is gauged the nozzle is retracted upwardly and the guide 52 is shifted laterally to the left as shown in FIG. 2 so as to be clear of the part which will be moving perpendicularly to the plane of the paper. This is done by actuation of the cylinder 74 causing the carriage, with the nozzle, to be shifted to the left with the nozzle in a raised position.

When the next pin support with its part 12' comes into an indexed stop position oppositely the guide foot 58, the carriage, together with the nozzle and guide, is shifted to the right as shown in FIG. 2 by actuation of the cylinder 74. This brings the foot 58 in against the base of the support 14' and the V-shaped notch causes the guide to center the nozzle with respect to the part. Once centered, the cylinder 46 is actuated and the nozzle reciprocates downwardly over the part into the position shown in FIG. 2.

The slide assembly for the guide block 66 permits the guide to adjust itself automatically with respect to the support 14'. Once in position, compressed air is introduced to the nozzle in the manner described previously and the part is gauged. The cycle then repeats itself.

In FIG. 2 there is shown schematically an operating system including solenoid valves connected to a source of compressed air for operating both the cylinders 46 and 74 as well as furnishing air to the nozzle. The valves are operatively connected to a timing control unit which serves to open and close the valves in the proper timed sequence. The back pressure from the nozzle drives the booster which, in turn, operates a suitable readout device.

The gauging apparatus disclosed herein is capable of an operating accuracy within .0005 inch and thus suitable for applications having extremely precise gauging requirements. The apparatus obviously may be employed to advantage in the gauging of a wide variety of parts both hard and soft, strong and fragile since it does not involve physical contact with the part while being fast and accurate.

While the invention has been described with particular reference to the illustrated embodiments, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

1. Apparatus for gauging a three dimensional object mounted on a support comprising,
 (a) a nozzle open at one end and closed at the other,
 (b) the nozzle opening conforming in contour to the object being gauged but of greater size to permit insertion of said object therein without contacting said object,
 (c) means for delivering fluid under pressure to said nozzle for discharge from said opening,
 (d) means for determining back pressure of said fluid when an object is inserted in the nozzle opening,
 (e) said nozzle being formed with an inwardly extending smoothly rounded annular shoulder near the open end thereof, and,
 (f) guide means operatively associated with said nozzle and spaced from the open end thereof to engage said support and guide said object into said opening without contacting said nozzle.

2. Apparatus according to claim 1 wherein said guide means includes a member operatively connected to said guide and formed with an object receiving V groove in register with the nozzle opening.

3. Apparatus according to claim 1 wherein said shoulder is tapered.

References Cited

UNITED STATES PATENTS

| | | | |
|---|---|---|---|
| 2,490,376 | 12/1949 | Rupley | 73—37.5 |
| 2,642,670 | 6/1953 | Dow | 33—174 |
| 2,902,149 | 9/1959 | Blust et al. | 73—37.8 |
| 3,438,244 | 4/1969 | Plumpe | 73—37.5 |

FOREIGN PATENTS 389,253  7/1965  Germany.

LOUIS L. PRINCE, Primary Examiner

W. A. HENRY II, Assistant Examiner